United States Patent
Funahara

(12) 
(10) Patent No.: US 6,648,040 B1
(45) Date of Patent: Nov. 18, 2003

(54) RADIAL TIRE FOR MOTORCYCLES AND METHOD OF MAKING THE SAME

(75) Inventor: Kiyoshi Funahara, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 96 days.

(21) Appl. No.: 09/703,641

(22) Filed: Nov. 2, 2000

(30) Foreign Application Priority Data

Nov. 5, 1999 (JP) ............................................. 11-315861

(51) Int. Cl.$^7$ ............................ B29D 30/06; B60C 3/00; B60C 9/18
(52) U.S. Cl. ................ 152/209.11; 152/454; 152/535; 152/538; 156/123; 264/315; 264/326
(58) Field of Search ............................... 156/110.1, 123; 264/501, 502, 315, 326; 152/209.11, 454, 526, 535, 538

(56) References Cited

U.S. PATENT DOCUMENTS

| | | | |
|---|---|---|---|
| 3,960,628 A | * | 6/1976 | Snyder |
| 4,050,497 A | * | 9/1977 | Pakur et al. |
| 4,815,514 A | * | 3/1989 | Hara et al. |
| 6,065,518 A | * | 5/2000 | Miyawaki et al. |

FOREIGN PATENT DOCUMENTS

| | | | |
|---|---|---|---|
| DE | 2430495 | * | 1/1976 |
| EP | 0502695 | | 9/1992 |
| EP | 0863025 | | 9/1998 |
| GB | 2042429 | * | 9/1980 |
| JP | 58-39438 | * | 3/1983 |
| JP | 3-96403 | * | 4/1991 |
| JP | 08052737 | | 2/1996 |
| JP | 10193918 | | 7/1998 |

* cited by examiner

Primary Examiner—Steven D. Maki
(74) Attorney, Agent, or Firm—Birch, Stewart, Kolasch & Birch, LLP

(57) ABSTRACT

A radial tire for motorcycles comprises a carcass extending between bead portions through a tread portion and sidewall portions, and a belt disposed radially outside the carcass in the tread portion and comprising two cross breaker plies of cords laid at angles of from 16 to 26 degrees with respect to the tire equator. And the method of making the radial tire comprises vulcanizing the tire in a mold which causes a variable stretch to the belt during vulcanizing the tire, wherein the stretch at the tire equator is in a range of from 6.0 to 7.0%, and the stretch gradually decreases from the tire equator to the axial edges of the belt. The stretch is defined as $(BD2/BD1-1) \times 100$ wherein BD1 is the inside diameter of the belt before tire vulcanization, and BD2 is the inside diameter of the belt during tire vulcanization.

12 Claims, 4 Drawing Sheets

RADIAL TIRE FOR MOTORCYCLES AND METHOD OF MAKING THE SAME

The present invention relates to a radial tire for motorcycles and a method of making the same being capable of improving lateral force variation of the tire.

In the motorcycle, if the lateral force variation of the front tire is large, lateral vibrations occur on the tire and handle-bar, and stability during straight running and cornering is greatly deteriorated. Hitherto, off-center of tire components such as carcass, tread belt and the like caused during building a green tire was regarded as the main cause of lateral force variation. Accordingly, efforts have been made to improve tire uniformity by improving precision of tire components and accuracy in assembling the tire components.

In recent years, the requirements for radial tires for high-performance high-speed motorcycles have become more and more severe. Therefore, to meet such requirements, it becomes necessary to further improve the lateral force variation and the like.

It is therefore, an object of the present invention to provide a radial tire for motorcycles and a method of making the same, in which the lateral force variation is highly improved together with other tire performance.

According to the present invention, a radial tire for motorcycles comprises a carcass extending between bead portions through a tread portion and sidewall portions, and a belt disposed radially outside the carcass in the tread portion and comprising two cross breaker plies of cords laid at angles of from 16 to 26 degrees with respect to the tire equator. And the method of making the radial tire comprises vulcanizing the tire in a mold which causes a variable stretch to the belt during vulcanizing the tire, wherein the stretch at the tire equator is in a range of from 6.0 to 7.0%, and the stretch gradually decreases from the tire equator to the axial edges of the belt. The stretch is defined as (BD2/BD1−1)×100 wherein BD1 is the inside diameter of the belt before tire vulcanization, and BD2 is the inside diameter of the belt during tire vulcanization.

BRIEF DESCRIPTION OF DRAWINGS

Embodiment of the present invention will now be described in detail in conjunction with the accompanying drawings.

Figure 1:
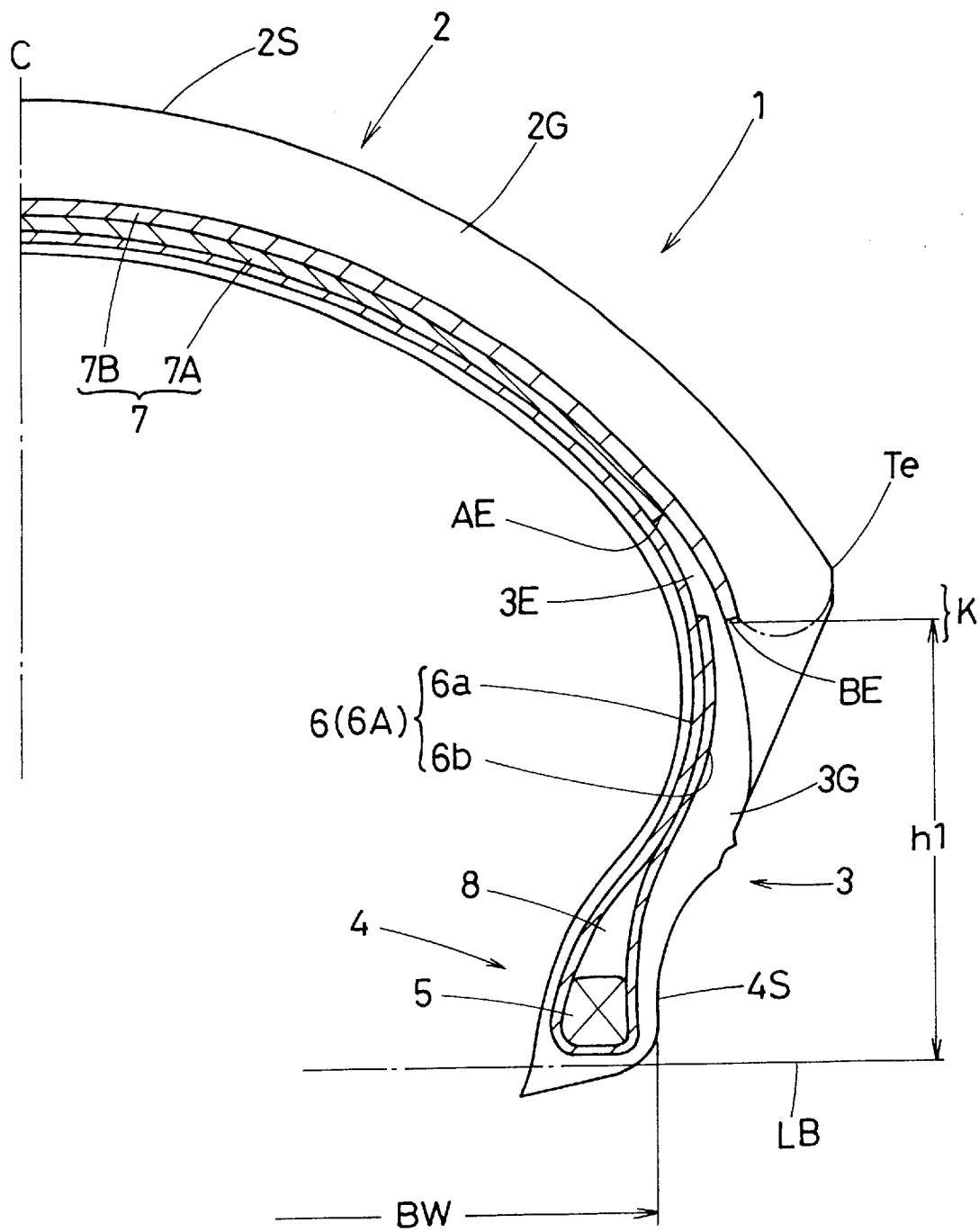
FIG. 1 is a cross sectional view of a radial tire of the present invention.

In the drawings, radial tire 1 comprises a tread portion 2 with tread edges Te, a pair of bead portions 4 with a bad core 5 therein, a pair of sidewall portions 3, a carcass 6 extending between the bead portions 4, and a belt 7 disposed radially outside the carcass 6 in the tread portion 2.

In this embodiment, the tire size is 120/60R17 for front wheel.

The belt 7 is composed of two or three plies including two cross breaker plies 7A and 7B of parallel cords laid at an angle of 16 to 26 degrees with respect to the tire equator C.

For the breaker cords, organic fiber cords, e.g. aromatic polyamide, aromatic polyester, nylon, polyester, rayon and the like can be used. Especially, high modulus organic fiber cords, e.g. aromatic polyamide, aromatic polyester are suitably used. In this example, the belt 7 is composed of a radially inner breaker ply 7A and a wider outer breaker ply 7B. The belt edge means the axial edge BE of the widest breaker ply 7B.

The carcass 6 comprises at least one ply of cords arranged radially at an angle of from 75 to 90 degrees with respect to the tire equator C and extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. For the carcass cords, organic fiber cords, e.g. nylon, polyester, rayon and the like can be used. Especially, nylon or rayon fiber cords are suitably used. In this example, the carcass is composed of a single ply 6A of cords arranged at 90 degrees. The turnup portions 6b are extended to a certain radial height which is substantially same as the radial height h1 of the axial edges BE of the belt 7, that is, they are extended into a radial height range K of from h1−6% to h1+6% (6% of h1) when measured from the bead base line LB. If the carcass 6 is composed of a plurality of plies, at least one of them is preferably has such high turnup portions 6b.

In each of the bead portion 4, a rubber bead apex 8 is disposed between the carcass main portion 6a and turnup portion 6b and tapers radially outward from the bead core 5.

In each of the sidewall portions 3, a rubber sidewall 3G is disposed axially outside the carcass 6. The rubber sidewall 3G extends radially outward from the bead portion 4 into the vicinity of the tread edge Te.

In this example, the sidewall 3G extends beyond the belt edge BE or the edge BE of the radially outer breaker ply 7B, and terminates at the axial edge AE of the inner breaker ply 7A so that the radially outer end portion 3E thereof is interposed between the carcass 6 and the radially outer breaker ply 7B. The radially inner surface of the inner breaker ply 7A substantially comes into contact with the carcass 6.

In the tread portion 2, a rubber tread 2G is disposed on the belt 7. In this example, an axial edge portion of the tread 2G beyond the belt edge BE sticks on the outer surface of the sidewall 3G.

Therefore, the axial edges AE of the inner breaker ply 7A are covered with the outer breaker ply 7B, and the radially inside of the axial edges BE of the outer breaker ply 7B is supported by and the softer sidewall rubber 3G. As a result, damage, separation and the like starting from the belt edges can be prevented. In view of this preventing effect and for the tire lateral stiffness, it is preferable that the carcass turnup portions 6b extended into a radial height range of from h1−6% to h1, more preferably h1−3% to h1.

The tread portion 2 which is a complex of the carcass 6, belt 7, tread rubber 2G, etc. is convexly curved so that the maximum tire section width lies between the tread edges Te as shown in FIG. 1.

This convex profile is given to the tire by a tire mold 20 during vulcanizing the tire.

Figure 2:
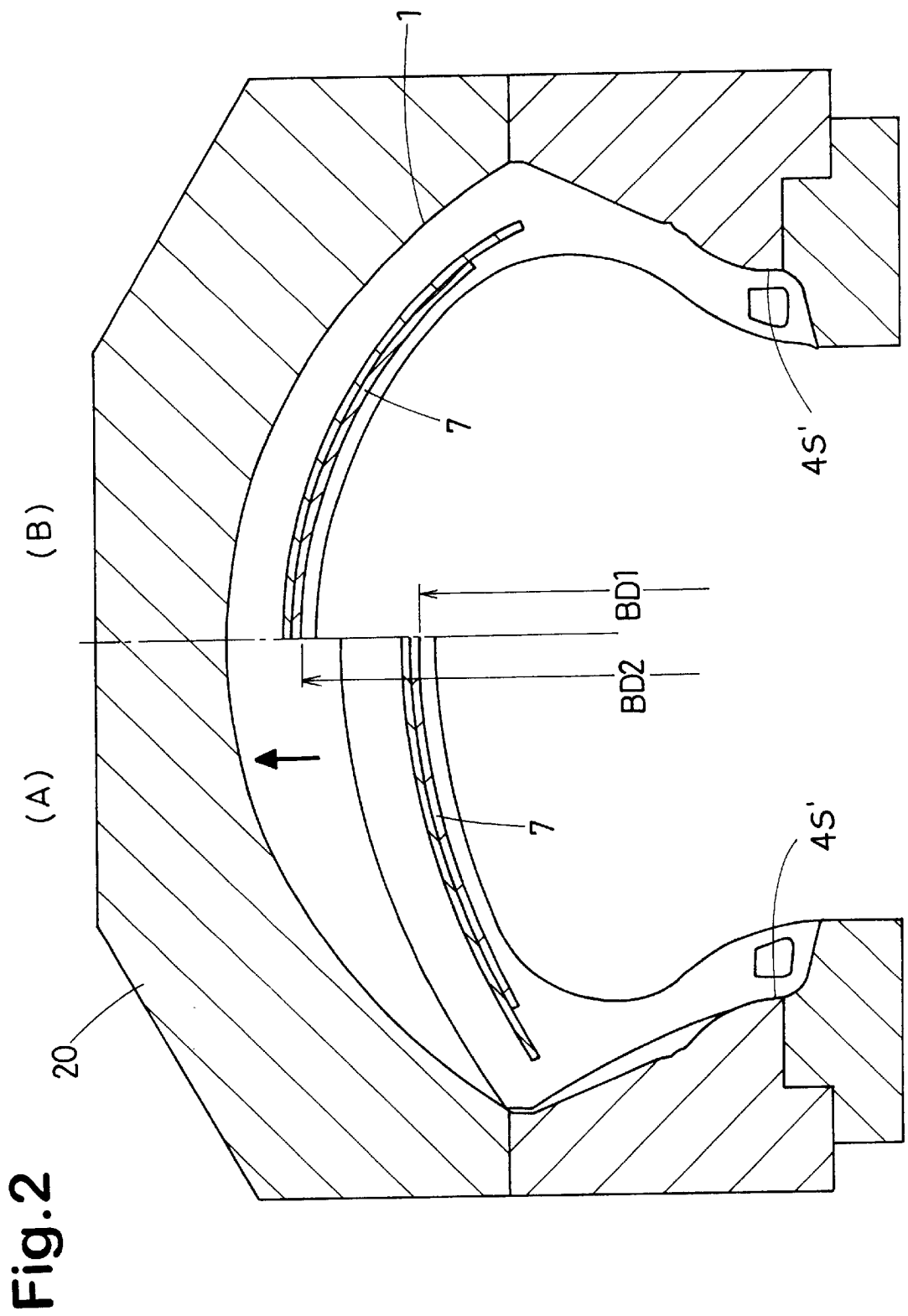
FIG. 2 shows a cross sectional view showing an exaggerated change in the tire shape together with a tire mold, wherein a right half shows a state during tire vulcanization and a left half shows a state before tire vulcanization.

In FIG. 2, the left side (A) shows a green tire put in the mold but not yet inflated to prepare for vulcanization. The right side (B) shows the tire having been vulcanized but not yet took out from the mold 20. This shape is substantially the same as that of the finished tire.

In the state of green tire, the radius of curvature of the tread portion 2 is relatively large (flat). The green tire put in the mold 20 is first inflated using a bladder to press the outer surface thereof onto the inside of the mold, and the tire is heated to be vulcanized. In this state, the tread portion 2 curves along the inside of the mold and the radius of curvature thereof decreases.

In the present invention, the stretch S of the belt 7 is specifically limited as follows. Here, the belt stretch S is (BD2/BD1−1)×100 wherein
BD1 is the inside diameter of the belt 7 in the state of green tire before vulcanization, and
BD2 is the inside diameter of the belt 7 during tire vulcanization.

Figure 3:
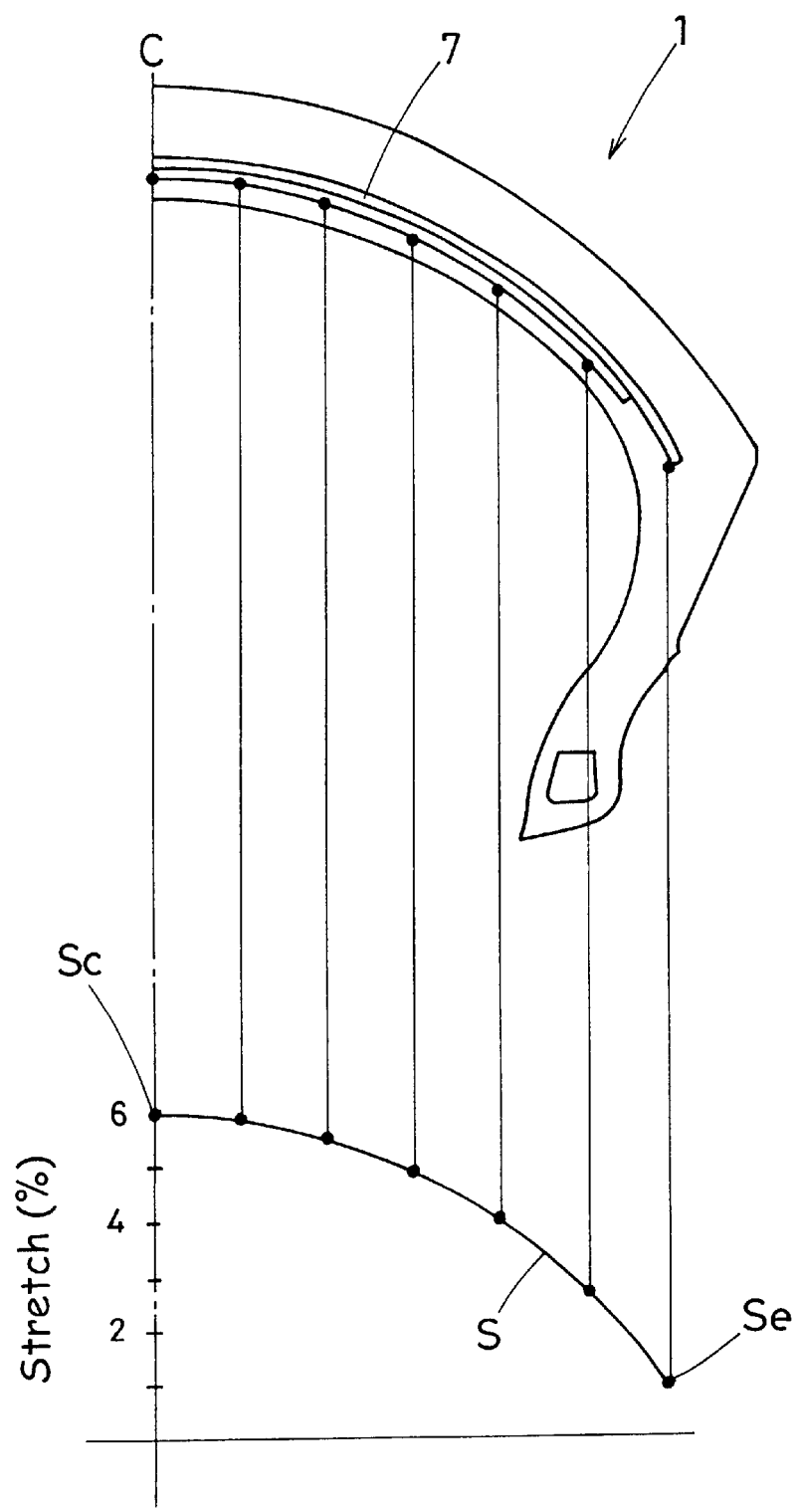
FIG. 3 is a diagram showing an example of the belt stretch distribution according to the present invention.

In order to improve the lateral force variation, steering stability during straight running and cornering performance, the stretch S(Sc) at the tire equator C is set in a range of from 6.0 to 7.0%, and the stretch S is gradually decreased from the tire equator C to the axial edges BE of the belt 7, as shown in FIG. 3. The stretch S(Se) at the belt edges BE is set in a range of more than 0% but not more than 2.0%, preferably from 0.5 to 2.0%, more preferably from 1.0 to 2.0%.

Table 1 is a test result showing correlation between the lateral force variation LFV and belt stretch. In this test, tires of size 120/60R17 (Rim size: MT3.5×17) were made changing the belt stretch. However, the belt stretch in each tire was substantially constant in its widthwise direction. The LFV was measured according to JASO-C607 under an inner pressure of 200 kPa and a tire load of 137 kgf.

TABLE 1

| Tire | A1 | A2 | A3 | A4 | A5 |
|---|---|---|---|---|---|
| Belt stretch (%) | 4 | 5 | 6 | 7 | 8 |
| Belt ply width | | | | | |
| before vulcanization | | | | | |
| inner ply (mm) | 115 | 115 | 115 | 115 | 115 |
| outer ply (mm) | 130 | 130 | 130 | 130 | 130 |
| after vulcanization | | | | | |
| inner ply (mm) | 115 | 110 | 107 | 105 | 98 |
| outer ply (mm) | 130 | 129 | 126 | 123 | 115 |
| LFV | | | | | |
| average (kgf) | 4 | 3.8 | 3 | 2.9 | 2.8 |
| standard deviation (kgf) | 1.2 | 1.1 | 0.9 | 0.9 | 0.8 |

As shown in Table 1, the average LFV and standard deviation decrease as the belt stretch increases.

However, in case the belt stretch is substantially constant across the belt width, the belt width in the finished tire decreases as the belt stretch increases. As a result, high speed performance and cornering performance deteriorate. Further, the ground contacting length has a tendency to decrease as the ground contacting part shifts towards the tread edge during cornering. Thus, it is difficult to improve cornering performance.

In the present invention, therefore, the belt stretch Sc at the tire equator C is set in a specific range of from 6.0 to 7.0% and the belt stretch S is continuously decreased from the tire equator to the belt edges, whereby even if the bank angle increases during cornering, a decrease in the ground contacting length is controlled, and the grip performance can be improved. Further, the lateral force variation and the steering stability during straight running are also improved.

If the stretch (Se) is more than 2.0%, a decrease in the ground contacting length occurs, and the cornering performance is deteriorated. If the stretch (Sc) is more than 7.0%, a decrease in the belt ply width occurs in the vulcanized tire. If the above-mentioned belt cord angles are less than 16 degrees, it is difficult to achieve the above-mentioned variable stretch. If the belt cord angles are more than 26 degrees, high-speed durability decreases.

Figure 4:
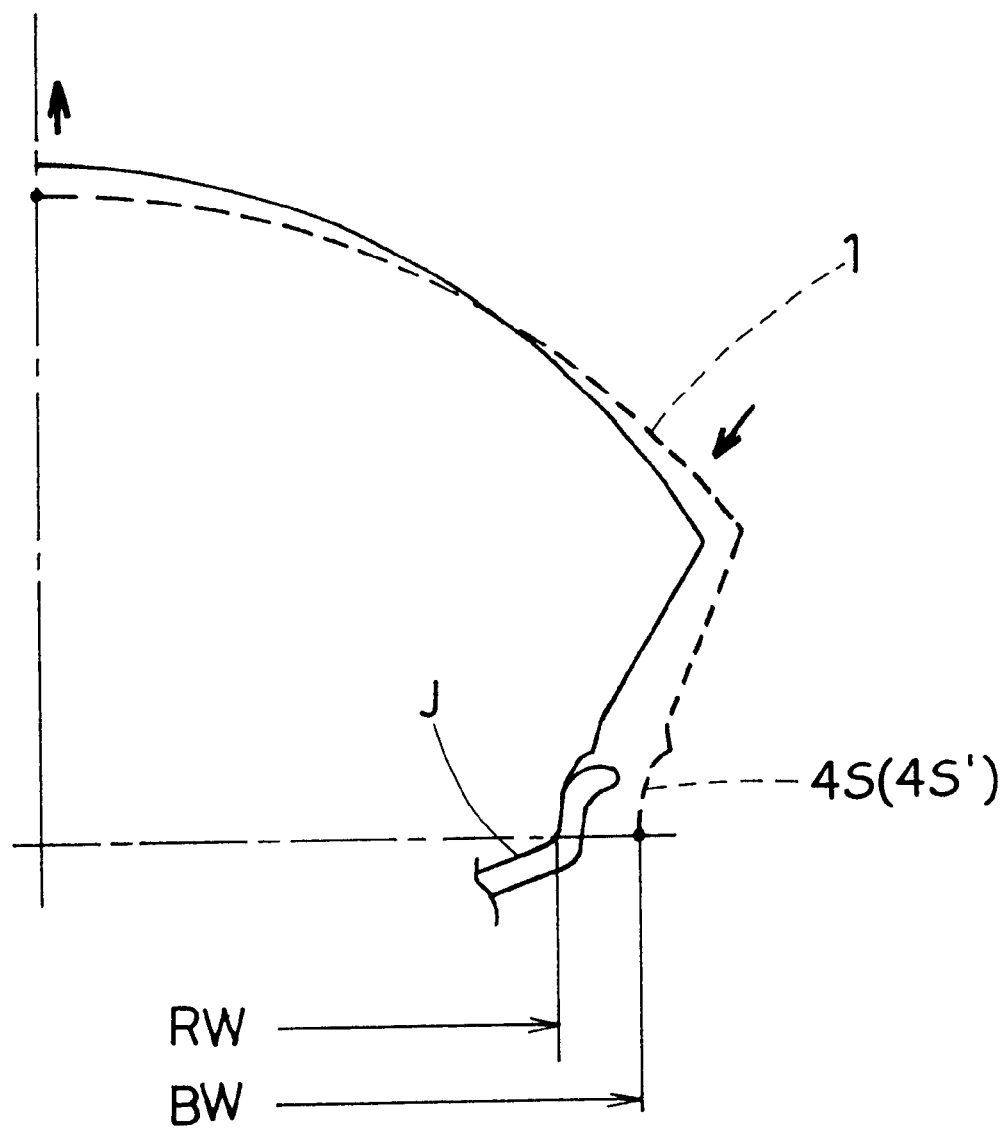
FIG. 4 is a diagram for explaining difference between the bead width and wheel rim width.

In this embodiment, as shown in FIG. 4, the bead width BW of the mold 20, which is the axial distance between the bead shaping faces 4S' thereof and which corresponds to the axial distance between the axially outer surfaces 4S of the bead portions 4 of the demolded vulcanized tire, is set to be wider than the rim width RW of the standard wheel rim J by 15 to 30 mm. By mounting such tire on the wheel rim J, the belt cord tension in the tread edge portions is decreased, and the decrease in the ground contacting length during cornering is again controlled to improve cornering performance. Further, the lateral force variation can be further improved as shown in Table 2. If the difference is less than 15 mm, the lateral force variation hardly improves. If the difference exceeds 30 mm, it becomes difficult to mount the tire on the wheel rim. Incidentally, the standard wheel rim is a wheel rim officially approved for the tire by, for example JATMA (Japan and Asia), T&RA (North America), ETRTO (Europe), STRO (Scandinavia) and the like.

The following Table 2 is a test result showing correlation between the lateral force variation LFV and the difference BW-RW between the bead width BW and rim width RW. In this test, tires of size 120/60R17 (Rim size: MT3.5×17) were made changing the bead width BW, and the LFV was measured according to JASO-C607 under an inner pressure of 200 kPa and a tire load of 137 kgf. Further, the rim mounting operation was also checked.

TABLE 2

| Tire | B1 | B2 | B3 | B4 |
|---|---|---|---|---|
| Belt stretch | | | | |
| Sc (%) | 6 | 6 | 6 | 6 |
| Se (%) | 0.5 | 0.5 | 0.5 | 0.5 |
| Bead width BW (mm) | 89 | 101 | 119 | 134 |
| Rim width RW (mm) | 89 | 89 | 89 | 89 |
| BW − RW (mm) | 0 | 12 | 30 | 45 |
| Average LFV (kgf) | 3 | 2.7 | 2.5 | 2.5 |
| Rim mounting | good | good | poor | impossible |

As described above, in the present invention, the belt stretch during vulcanizing the tire is set in the specifically limited narrow range of from 6.0 to 7.0% at the tire equator and gradually decreased from the tire equator to the belt edges. Therefore, the lateral force variation and steering stability during straight running can be improved. Even if the ground contacting part shifts toward the tread edge during cornering, the ground contacting length is maintained and cornering performance can be improved.

The present invention can be suitably applied to tires for front wheels.

What is claimed is:
1. A method of making a radial tire for motorcycles, the radial tire comprising
a carcass extending between bead portions through a tread portion and sidewall portions,
a belt disposed radially outside the carcass in the tread portion,
the belt composed of two or three plies including two cross breaker plies of cords laid at angles of from 16 to 26 degrees with respect to the tire equator, and the tread portion curved convexly so that the maximum tire section width lies between tread edges, the method comprising:

vulcanizing the tire in a mold which causes a stretch to the belt during vulcanizing the tire, the stretch defined as (BD2/BD1−1)×100 wherein BD1 is the inside diameter of the belt before tire vulcanization, and BD2 is the inside diameter of the belt during tire vulcanization, the stretch at the tire equator is in a range of from 6.0 to 7.0%, and the stretch gradually decreases from the tire equator to the axial edges of the belt.

2. The method according to claim 1, wherein the stretch at the belt edges is not more than 2.0%.

3. The method according to claim 1, wherein the bead width of the mold is wider than the rim width of a wheel rim for the tire by 15 to 30 mm.

4. The method according to claim 1, wherein said two cross breaker plies are a radially inner ply and a radially outer wider ply disposed on the inner ply, the carcass comprises a high-turnup ply having turnup portions extended radially outwardly into a radial height range of from h1−6% to h1+6%, wherein hi is a radial height of axial edges of the belt measured from a bead base line, a rubber sidewall is disposed axially outside the carcass in each of the sidewall portions, and the sidewall extends radially outwardly beyond the axial edge of the radially outer breaker ply, passing between the radially outer breaker ply and the carcass, and terminates at the axial edge of the radially inner breaker ply.

5. The method according to claim 1, wherein the stretch at the belt edges is from 0.5 to 2.0%.

6. The method according to claim 1, wherein the stretch at the belt edges is from 1.0 to 2.0%.

7. A radial tire for motorcycles comprising:

a carcass extending between bead portions through a tread portion and sidewall portions, a belt disposed radially outside the carcass in the tread portion and composed of two or three plies including two cross breaker plies of cords laid at angles of from 16 to 26 degrees with respect to the tire equator, the tread portion curved convexly so that the maximum tire section width lies between tread edges, said belt stretched during vulcanizing the tire in a mold so that the stretch at the tire equator is in a range of from 6.0 to 7.0%, and the stretch gradually decreases from the tire equator to the axial edges of the belt, wherein the stretch is defined as (BD2/BD1−1)×100, BD1 is the inside diameter of the belt before vulcanization, and BD2 is the inside diameter of the belt during vulcanization.

8. The radial tire according to claim 7, wherein the stretch at the belt edges is not more than 2.0%.

9. The tire according to claim 7, wherein the bead width of the tire is wider than the rim width of a wheel rim for the tire by 15 to 30 mm.

10. The tire according to claim 7, wherein said two cross breaker plies are a radially inner ply and a radially outer wider ply disposed on the inner ply, the carcass comprises a high-turnup ply having turnup portions extended radially outwardly into a radial height range of from h1−6% to h1+6%, wherein hi is a radial height of axial edges of the belt measured from a bead base line, a rubber sidewall is disposed axially outside the carcass in each of the sidewall portions, and the sidewall extends radially outwardly beyond the axial edge of the radially outer breaker ply, passing between the radially outer breaker ply and the carcass, and terminates at the axial edge of the radially inner breaker ply.

11. The method according to claim 7 wherein the stretch at the belt edges is from 0.5 to 2.0%.

12. The method according to claim 7, wherein the stretch at the belt edges is from 1.0 to 2.0%.

* * * * *